(12) United States Patent
Nathanson et al.

(10) Patent No.: US 12,437,646 B2
(45) Date of Patent: Oct. 7, 2025

(54) METHOD, SYSTEM, AND COMPUTER PROGRAM FOR HIGH CONFIDENCE OBJECT-ACTOR RUN-TIME DETECTION, CLASSIFICATION, AND TRACKING

(71) Applicant: Sonamore, Inc., Ann Arbor, MI (US)

(72) Inventors: Martin Daniel Nathanson, Westmount (CA); Andrew Gilbert Miller, Pittsburgh, PA (US)

(73) Assignee: SONAMORE INC., Ann Arbor, MI (US)

( * ) Notice: Subject to any disclaimer, the term of this patent is extended or adjusted under 35 U.S.C. 154(b) by 100 days.

(21) Appl. No.: 18/612,439

(22) Filed: Mar. 21, 2024

(65) Prior Publication Data

US 2024/0321103 A1 Sep. 26, 2024

Related U.S. Application Data

(60) Provisional application No. 63/453,614, filed on Mar. 21, 2023.

(51) Int. Cl.
*G08G 1/16* (2006.01)
*G08G 1/01* (2006.01)

(52) U.S. Cl.
CPC ........... *G08G 1/164* (2013.01); *G08G 1/0116* (2013.01); *G08G 1/166* (2013.01)

(58) Field of Classification Search
CPC ....... G08G 1/164; G08G 1/0116; G08G 1/166
See application file for complete search history.

(56) References Cited

U.S. PATENT DOCUMENTS

| 11,516,669 | B2 * | 11/2022 | Shimizu | .................. H04W 4/40 |
| 2019/0369641 | A1 * | 12/2019 | Gillett | .................. G05D 1/0088 |
| 2020/0065978 | A1 * | 2/2020 | Jales Costa | .......... G06V 10/435 |
| 2020/0137580 | A1 * | 4/2020 | Yang | .................. H04W 12/122 |
| 2021/0041883 | A1 * | 2/2021 | Bansal | ................ G05D 1/0231 |
| 2021/0281986 | A1 | 9/2021 | Zhu et al. | |

(Continued)

OTHER PUBLICATIONS

Schiegg, F.A.; Llatser, I.; Bischoff, D.; Volk, G. Collective Perception: A Safety Perspective. Sensors 2021, 21, 159. https://doi.org/10.3390/s21010159.

(Continued)

*Primary Examiner* — Hussein Elchanti
(74) *Attorney, Agent, or Firm* — KATTEN MUCHIN ROSENMAN LLP

(57) ABSTRACT

Provided a Road Side Unit (RSU) transceiver enabled to receive authenticated participant Society of Automotive Engineers (SAE) standard J2735 Basic Safety Messages, RTK corrected GNSS positioning data, SAE standard J3224 Sensor Data Sharing Messages and equipped with a sensor suite consisting of one or more electro-optical sensors, camera sensors, thermal imaging sensors, lidar sensors, ultrasonic sensors, and or radar sensors; the system may include one or more processors programmed or configured to receive data from the system's own sensor suite, reporting transceivers and other network connected devices, to construct high confidence object-actor detection, classification, and tracking perception messages representing the object-actors in the system's field of view for use in other system internal processes and transmit to other external devices for use.

20 Claims, 1 Drawing Sheet

(56) References Cited

U.S. PATENT DOCUMENTS

2022/0095115 A1     3/2022   Shimizu et al.
2022/0269279 A1*   8/2022   Redford ................. G06N 3/045

OTHER PUBLICATIONS

International Search Report and Written Opinion mailed Jul. 24, 2024, from International Patent Application PCT/US2024/020856, 19 sheets.

ETSI Secretariat: "LS on SAE Sensor Sharing Service(J3224) and Maneuver Sharing and Coordinating Service (J3186) standards development", ETSI DRAFT;ITSWG1(22)060021, European Telecommunications Standards Institute(ETSI), 650, Route Des Lucioles; F-06921 Sophia-Antipolis; France, vol. WG ITS WG1 Application Requirements and Services Jun. 27, 2022(Jun. 27, 2022), pp. 1-59,XP014431567, Retrieved from the Internet: URL:ftp://docbox.etsi.org/ITS/ITSWG1/05-CONTRIBUTIONS/2022/ITSWG1(22).

* cited by examiner

METHOD, SYSTEM, AND COMPUTER PROGRAM FOR HIGH CONFIDENCE OBJECT-ACTOR RUN-TIME DETECTION, CLASSIFICATION, AND TRACKING

CROSS-REFERENCE TO RELATED APPLICATIONS

The present application claims priority to U.S. provisional patent application No. 63/453,614, filed on Mar. 21, 2023, the contents of which are hereby incorporated by reference.

TECHNICAL FIELD

The disclosed subject matter relates generally to methods, systems, and products for human and computer control of vehicles operating in vicinity of road areas, the training of vehicle control system machine learning and/or perception systems, and the development, validation, and verification of vehicle control systems prior (e.g., simulation), during, and following road operation.

BACKGROUND

A significant proportion of object-actors in the road network environment (both vehicles and Vulnerable Road Users) are not V2X participants, and therefore without V2X-based cooperative awareness, the perceived environment model must rely entirely on sensor-based perception of these object-actors. But establishing the degree of confidence in this perception is dependent on knowledge of ground truth.

The premise of the present disclosure is that cooperative awareness messages (BSMs in North America/CAMs in Europe) can be used as a basis to establish ground truth for perception systems' processes. As such, the deviation of position, as reported by sensors, from the RTK-corrected position reported in cooperative awareness messages, is an accurate, quantifiable measure of ground truth and a precursor dataset on which to determine the confidence level of perception systems' outputs.

A proxy for ground truth is high confidence cooperative awareness provided with confidence levels, both in terms of position as well as object classification. These confidence level fields form part of the basic message structure defined in SAE J3224—cooperative perception messages. However, without establishing and incorporating ground truth into perception systems of the participating contributors, there can be no high confidence in the accuracy of a perception message, and as such the message source becomes unreliable if the message itself is not unusable by the receiver. Ground truth must be established and incorporated in the training and validation of the perception system and then regularly established in the run time operation of the system to provide confidence level determination on the perception system; and this especially for the perceptions systems outputs on non-SAE J3224/J2735 participating object-actors (e.g., Vulnerable Road Users).

Current practice for machine learning/computer vision (ML/CV) based cooperative perception is to develop awareness of object-actors through consensus. Consensus is established through varying processes to corroborate two or more participants' independent reports of their respective perception outputs of the object-actors in their field of view. Per SAE J3224, participants should be reporting the confidence on various data fields they share; however, there is no widely adopted industry standard for establishing confidence on machine learning/computer vision inferred, or predicted, perception. Current industry and academic practice to establish a confidence level may rely on some form of measuring the variances or marginal differences inherent to the contributing object-actor reports used to produce consensus. Absent is the incorporation of objective ground truth and the use of ground truth to establish high confidence perception as well as confidence measurement on perception outputs.

Determining the confidence level of a perception system's output is essential to cooperative awareness. The system described below builds off established ground truth to not only provide high confidence perception but also to measure confidence of a system's perception system's output and thereby enable trusted high confidence cooperative awareness.

Uncertainty and Confidence:

Pose is an object or actor's position, velocity state at a sample in time. A level of uncertainty exists in Advanced Driver Assistance Systems (ADAS) and Automated Driving System (ADS) equipped vehicles in motion. The in-motion nature of ADAS and ADS vehicles inherently generates uncertainty in the measurement of both their own pose and the pose of object-actors they sense and perceive. The pose state may change in the time in which an ADAS/ADS senses and processes sensor data to perceive and make pose measurement. This uncertainty is coupled with general uncertainty of the ADAS/ADS sensors acquiring a changing background each data capture cycle; a vehicle in motion presents its sensors with new pixel, or equivalent sensor discrete rendering modality, each cycle. The relation of moving object-actors and static environment introduces inherent uncertainty. In addition to pose, uncertainty surrounds detection and classification processes to establish the presence of an object-actor in the field of view, the type/instance of the object-actor, and the follow-on disposition or pose state of the object-actor. Given that uncertainty exists, an ADS/ADAS system should both have the means to determine its own confidence level in its own system perception as well as receive an indicated confidence level when the system consumes perception reports from sources external of the system. Confidence and Indicated Confidence provide the system a constructive frame by which to process command and decision for safety and driving tasks. In the case of cooperative perception shared between two or more ADS/ADAS or V2X participants an objective method of determining "Confidence Level" and "Indicated Confidence Level" is required to make meaningful use of other parties' reports.

Basic Safety Messages/Cooperative Awareness Messages:

SAE J2735 Basic Safety Message (BSM) or the European equivalent Cooperative Awareness Message (CAM) is a standardized data object encapsulated in abstract syntax notation-based message format transacted to provide situational awareness in the road operating environment. The Road Side Unit (RSU)/Onboard Unit (OBU) ecosystem receives Real Time Kinematic GNSS positioning updates to ensure that systems are localizing with accurate global coordinates for use in their position reporting.

Situational awareness information data shared in BSMs/CAMs include a self-report of a vehicle's state 10 times a second (10 Hz) that includes data attributes for latitude, longitude, elevation, accuracy of the coordinates, speed, heading, steering wheel angle, acceleration, brake system status, and vehicle length and width size. BSM/CAM information digested by Advanced Driver Assistance Systems (ADAS) and/or Automated Driving Systems (ADS) enables augmented road situational awareness, beyond line-of-sight awareness and forewarning, and higher confidence object perception processes accounting for third party vehicles and infrastructure reporting their respective objective coordinate locations and dimensions. The benefits of this augmented awareness are improved safety outcomes and more efficient vehicle travel.

BSMs/CAMs are transacted in a one-to-many (broadcast) mode via, but not limited to, V2X wireless communication protocols such as IEEE 1609, aka Wireless Access Vehicular Environment (WAVE), with the medium access control (MAC) layer being IEEE 802.11p, or PC5 (i.e., C-V2X). BSMs/CAMs may be shared in both peer to peer or "vehicle to vehicle" (V2V) or vehicle to infrastructure (V2I) and extension of V2I is vehicle-to-network (V2N). The communications ecosystem for V2V, V2I, and V2N is generally referred to as Vehicle-to-Everything or "V2X".

To exchange BSM/CAMs, participant mobile object-actors are equipped with a radio frequency transceiver modem referred to as an Onboard Unit (OBU). A fixed infrastructure radio frequency transceiver is referred to as Roadside Unit (RSU). The IEEE 1609.2 component of the WAVE stack ensures the security and authentication of data transacted in the ecosystem, using SCMS certificates (i.e., "credentials"), thereby enabling RSU/OBU units to determine the trustworthiness of the BSM/CAM sender and by extension its messages. Devices compliant with IEEE 1609.2 and provisioned with SCMS credentials, i.e., RSUs and OBUs, are called End Entities (EEs).

Security Credential Management System:

SCMS is an instantiation of a public key infrastructure (PKI) which generates and delivers certificates to EEs to provide trust and assurance for messages which they broadcast, SAE J3275 and SAE J3224 messages encapsulating sensor data aimed at on-board ADAS/ADS. SCMS can revoke credentials where trust cannot be established or maintained. Each EE participant receives SCMS credentials that are used to sign issued messages and be read by recipients to establish the trustworthiness of the message's reporting source. The SCMS system enables EEs to incorporate BSMs/CAMs and Sensor Data Sharing Messages (SDSM) into their operating pictures with increased trust than otherwise available from non-credentialed messaging.

Sensor Data Sharing Message:

The SAE J3224 defined Sensor Data Sharing Message (SDSM) is a standardized text object message format to share the object-actor detections and classifications of participant RSUs and vehicles equipped with OBUs. Under the J3224 standard the participants form a Sensor Sharing Service System (SSS System). Participant vehicles being equipped with an OBU and corresponding GNSS receivers and receiving RTK corrections to apply to GNSS positioning data and sensors such as LIDAR, RADAR, and camera and corresponding compute to process sensor data report their detection and classification of object-actors in the format of SDSMs. In vicinity SSS System participant RSUs and OBU equipped vehicles send and receive SDSM and may make use of in downstream systems to augment and confirm their own road operating awareness. To make use of another participant's transmitted SDSM an indicated confidence level should be provided by the sender in order to provide the recipient with a means to determine the weighting of incorporating the message data into its worldview.

Ground Truth:

Ground Truth is the term to describe information known to be real or true by direct observation and measurement. Ground Truth is a corroborated known position of an object-actor at the same time the object-actor is detected in a sensor data capture cycle (e.g., frame or item in data stream). Ground truth may be established in live running processes where RTK GNSS reporting from the detected object-actor is actively occurring simultaneously with sensor capture on the detected object-actor. Ground truth may also be established post running where position is subsequently measured or determined and attached to the corresponding sensor captured data frame or stream; an example of a post-run ADAS/ADS perception systems require ground truth data for the development of perception models and operate with high confidence when ground truth can be provided during runtime operation. Perception models are trained and validated by providing ground truth sensor data where the object-actors are detected and classified a priori. During live runtime operation, perception models reconcile the runtime sensor data with runtime known ground truth on the object-actors in the operating environment.

High Confidence:

High Confidence is where, in the absence of direct measurement of ground truth, the accuracy of an object-actor's presence, classification, position, velocity, and acceleration is determined to be "high" in post occurrence analysis where ground truth can be determined. Through statistical analysis the run-time confidence is determined to be high when the system producing the evaluated output meets a statistically significant threshold to match or approach that of ground truth and/or occurs where object-actor reports of other participants match the system's own prediction within a statistically significant threshold based on preestablished parameters. A system can self-determine its confidence level on multiple parameters where ground truth data is periodically and/or occasionally provided and enables the system to measure differences between the runtime perception inference and the ground truth. The system conducting confidence checks in the manner set forth below will always maintain high confidence on a binary state basis: (A) the system has high confidence on the perception inference it is producing OR (B) the system has high confidence that it is not producing high confidence perception inference. These two high confidence states are maintained across multiple perception and ground truth parameters upon which measurement is taken, e.g., object-actor category-type, position, velocity, acceleration.

SUMMARY

Accordingly, it is an object of the presently disclosed subject matter to provide methods, systems, and computer program products for establishing high confidence detection, classification and tracking perception output on object-actors with use of J2735 BSM/CAM and J3224 SDSM messages, RTK corrected GNSS positioning data, and sensor data. The methods, system, and computer program may reside on a host base system; this host base system serves as the physical platform for sensors and compute that outputs sensor data of the sensed road environment in the vicinity of the host system.

These advantages and others are achieved, for example, by a system including one or more processors programmed or configured (i) to receive data associated with road environment object-actor sensor based detection and classification predictions, IEEE 1609 standard Security Credential Management System (SCMS) cryptographically signed SAE J2735 standard Basic Safety Messages (BSM)/Cooperative Awareness Messages (CAM), and IEEE 1609 standard SCMS cryptographically signed SAE J3224 standard Sensor Data Sharing Messages (SDSM); and (ii) to determine run-time detection, classification, and tracking of object-actors in the road operating environment in relation to a system relative coordinate reference map, When determining detection, classification, and tracking of object-actors, the one or more processors are programmed and configured (iii) to extract object-actor associated data in the received SCMS cryptographically signed SAE J2735 participant broadcasted Basic Safety Messages/Cooperative Awareness Messages from which an object-actor's pose is determined, wherein the received data includes, but is not limited to a reported object-actor's real-time kinematic GNSS corrected position, spatial dimensions (e.g. length× width×height), and the categorical-type classification of the object-actor, wherein the BSM/CAM extracted data is transformed into a format to store and retrieve the represented object-actor as an artifact within a system relative coordinate reference map, (iv) to extract object-actor associated data in received SCMS cryptographically signed SAE J3224 participant broadcast Sensor Data Sharing Messages (SDSM), wherein the received data may include an external observers's report of a sensed object-actor's position, category-type classification, timestamp of observation, and location in GNSS based global coordinates, and wherein the SDSM extracted data is transformed into a format to store and retrieve the represented object-actor as an artifact within a system relative coordinate reference map, (v) to construct representative object-actor artifacts within a system relative coordinate reference map, wherein a coordinate system comprises a data structure wherein persistent and/or temporary data representing road environment features and object-actors are related to the host base system in a format of normalized reference units of measure related to the sensing system's current position and/or a frame of reference, wherein the object-actors represented in the reference map are data artifacts generated from either sensor based predicted perception associated output data, SDSM based message data, or from BSM/CAM based message data which contain position and occupancy attributes normalized with respect to the base system reference coordinate system, wherein in addition to the object-actor artifacts applicable a priori and/or run-time mapped and sensed road environmental features are also represented, (vi) to predict object-actors present within the fields of view of the one or more sensors of the system; wherein the output of prediction comprises predicted detection and classification of object-actors' presence, position, spatial dimensions, and category-type associated with received sensor data, wherein the received sensor data is associated with one or more camera, LIDAR, thermal, or RADAR sensor, and wherein the prediction is based on the output of one or more machine learning models that predict the presence, position, category-type, and geometric dimensions of an object-actor, wherein the predicted object-actor output is sent to the system relative coordinate reference map as a predicted object-actor artifact, (vii) to determine the existence of an actual object-actor in the road environment associated with representative object-actor artifacts in the system relative coordinate reference map, wherein one or more procedures and/or machine learning models determine that two or more artifacts correspond to the same object-actor, (viii) to determine confidence levels on object-actor predicted detection, classification, and tracking, wherein measurement of the accuracy of aggregate weighted prediction of object-actor detection classification and tracking over the course of preceding and the current run-time outputs with available BSM/CAM based object-actor data artifacts determines the error between predicted vs actual detection, classification, and tracking, wherein the measured accuracies are persisted in system memory for reference in subsequent run-time operation, wherein the measured accuracy established from received BSM/CAM data based artifacts is determined as an objective comparison to measure internal generated predicted perception, external generated SDSMs, and the aggregate combinations thereof against actual detection and classification, and tracking parameter values, wherein the system determines a confidence interval based on a priori and runtime updated thresholds of accuracy, wherein associated thresholds are comprised of parameter value ranges determined to meet statistically significant precision requirements that indicate low uncertainty about a predicted value and merit the use of the underlying predicted value for perception runtime use in a road environment, wherein the outputs are confidence intervals for the crossmatched object-actor's current reconciled state parameter values including indication of high confidence for the predicted object-actor associated state values or high-confidence that the system's perception is unable to detect, classify, and track object-actors within threshold range, and (ix) to persist the matched object-actors artifacts as ground truth or high confidence determined object-actors in the system relative reference coordinate map which subsequently are logged with crossmatched and reconciled data including confidence level attributes associated with Basic Safety Messages/Cooperative Awareness Messages, Sensor Data Sharing Messages and road environment sensor-perception data.

A minimum of one of the two or more artifacts is associated with a received BSM/CAM data upon which one or more algorithms and or machine learning models establishes the existence of a relationship between two or more object-actor representative artifacts. A matched pair or set of artifacts containing a BSM/CAM based artifact is reduced to a ground truth object-actor in the system reference map, and the match reference is applied to crossmatched artifacts to construct a ground truth object-actor artifact to reside in the applicable state within the system relative coordinate reference map, when no sensor associated object-actor artifacts are identified as a match to a BSM/CAM artifact the BSM/CAM is established as a ground truth perception object-actor.

In the absence of a BSM/CAM associated artifact but there exists representative object-artifacts based on predicted perception data and/or SDSM messages, measure the artifacts' parameters in relation to each other with respect to the system relative coordinate system map wherein the module with one or more algorithms and or machine learning models establishes the existence of a match between two or more object-actor representative artifacts and determines confidence level of a crossmatch between two or more object-actor artifacts, where the parameters used to determine crossmatch include but are not limited to object-actor classification category-type, position, velocity, and acceleration.

With the ground truth or otherwise matched perception process predicted or SDSM reported object-actor precursor artifacts used to determine match are removed from the reference map, wherein the output of the matched artifacts with corresponding map update is an aggregate reconciled collection of run-time determined ground truth and high confidence detection, classification, and tracking of object-actors in the road environment, wherein the system relative coordinate reference map updates to reflect the determined state for subsequent system runtime use and/or external transmission of ground truth and high confidence based data.

The one or more processors may be further programmed or configured to determine the current run-time confidence interval based on the current run-time present measurable environmental conditions and the frequency, accuracy, and timeliness of BSM/CAM based accuracy measurements occurring prior to this determination, wherein determination of is related to the measured performance of the reconciliation of predicted object-actors output and the BSM/CAM associated ground truth output, wherein the output are differences between actual and predicted object-actor state attributes comprise data, wherein the output is compared to time and condition weight data to determine confidence intervals for respective state attributes.

The one or more processors may be further programmed or configured to determine the current adjustment factor to associate with the run-time and current environmental conditions and system measured accuracy performance, wherein the adjustment factors are timestamped, and the timestamped factors are used to determine a decay factor that adjusts the confidence interval associated tolerances based on statistical significance of the historical uncertainty introduced beyond the moment of immediate ground truth vs predicted reconciliation, the output being used to generate internal data to base the determination of the systems confidence in its determination of perception.

The one or more processors may be further programmed or configured to construct high confidence perception reports for use by both internal and external systems, wherein the output for external systems is transmitted via one or more network devices or radio frequency transceivers.

The one or more processors are further programmed or configured to persist sensor data and reconciled ground truth and high confidence perception outputs with timestamps, wherein the timestamps relate reconciled perception outputs as labeled features in the corresponding logged sensor data, wherein the labeled, logged data collection provides machine learning model training material for a priori machine learning model training and subsequent construction of high confidence perception models.

These advantages and others are achieved, for example, by a method for the steps (i)-(ix) described above.

These advantages and others are further achieved, for example, by at least one non-transitory computer readable medium storing at least one computer program product that comprises one or more instructions that cause at least one processor to perform the steps (i)-(ix) described above.

BRIEF DESCRIPTION OF THE DRAWINGS

The preferred embodiments described herein and illustrated by the drawings hereinafter are included to illustrate and not to limit the invention, where like designations denote like elements.

DETAILED DESCRIPTION

Figure 1:
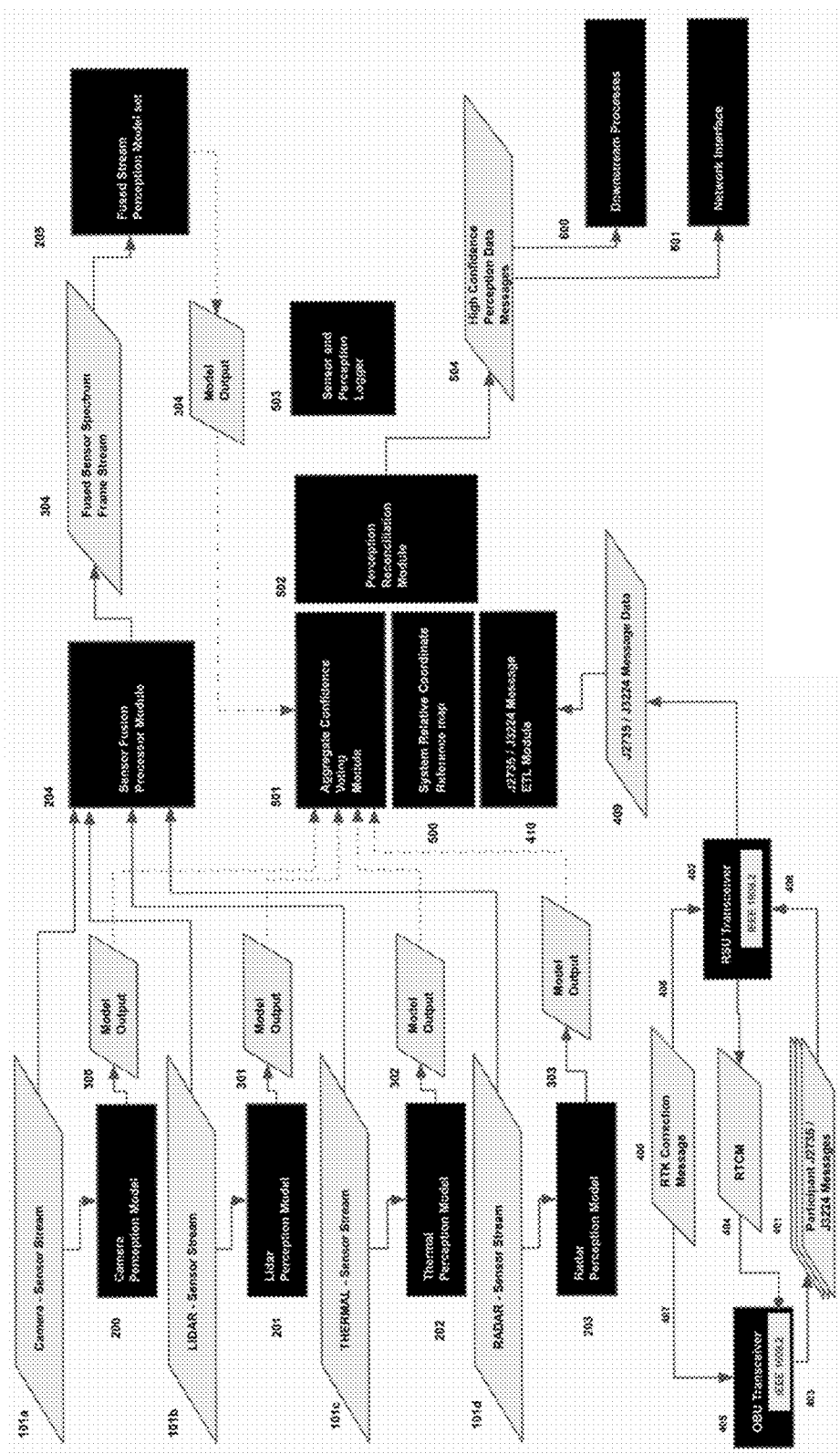
FIG. 1 shows a non-limiting illustrative system overview. In another embodiment of the system illustrated in FIG. 1; the RSU transceiver may be replaced by an OBU transceiver.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

The disclosed invention provides methods, systems, and computer program products for establishing high confidence detection, classification and tracking perception output on object-actors with use of J2735 BSM/CAM and J3224 SDSM messages, RTK corrected GNSS positioning data, and sensor data. The methods, system, and computer program may reside on a host base system; this host base system serves as the physical platform for sensors and compute that outputs sensor data of the sensed road environment in the vicinity of the host system.

With reference to FIG. 1, shown is a non-limiting illustrative system overview. In another embodiment of the disclosed invention, the RSU transceiver 402 shown in FIG. 1 may be replaced by an OBU transceiver. An RSU 402 is equipped either with 408 a direct RTK receiver or RTK correction updates via a network interface that sends RTK corrections to the RSU. The system receives Real Time Kinematic positioning (RTK) error corrections 400 to global navigation satellite systems (GNSS) positioning. The RTK correction updates provide high accuracy on position data, which the RSU transceiver 402 may transform into SAE J2735 RTCM (Radio Technical Commission for Maritime Services) messages 404 to be broadcast in the ecosystem and used by OBU 405 to apply corrections to the position data in their BSMs/CAMs. Alternatively, OBU 405 equipped with RF receiver 403 may acquire the RTK correction 400 directly.

The IEEE 1609.2 module 403 incorporated in OBU 405 uses Security Credential Management System (SCMS) credentials to sign outgoing BSMs/CAMs and SDSMs. The equivalent module in RSU 402 validates received BSMs/CAMs and SDSMs. This ensures that only authenticated participants can report BSMs/CAMs and SDSMs, thereby preventing rogue participants from providing erroneous data to the system and provides assurance over the integrity of the BSM/CAM data and follow-on system SDSM broadcasts to shared perception participants.

The system RSU radio transceiver module 402 receives both BSMs/CAMs and SDSMs from reporting participants; the IEEE 1609.2 module 406 validates received messages before passing the message data to the J2735/J3224 Message Extract, Transform and Load (ETL) module 410. The system Incoming BSM/CAM ETL module 410 extracts BSM/CAM and/or SDSM data and transforms the provided position and spatial dimensions data into system relative coordinates and constructs an object-actor data artifact. The ETL module 401 loads the BSM/CAM and SDSM associated artifacts into a system relative coordinate reference map 500 along with the reported object-actor's category-type classification and the timestamp of position observation as indicated by the reporting J2735/J3224 participant. The BSM/CAM, not the SDSM, associated artifacts within the reference map 500 constitute the basis for ground truth determination and the reconciliation and matching process against the system's perception system predicted object-actor artifacts and participants reported SDSM associated object-actor artifacts.

The system in some embodiments may consume sensor data streams that may include, but not limited to, one or more of camera, lidar, radar, and thermal spectrum modalities 101a, 101b, 101c, 101d, the sensor data runs through perception models for each respective sensor spectrum type 200, 201, 202, 203 as well as jointly fed into the sensor fusion processor module 204. The Sensor Fusion Preprocessor Module 204 sends combined sensor streams formatted for use by the Fused Stream Perception Model set 205. Each respective sensor perception module performs object detection and classification with a calibrated algorithm-model set built a priori.

Independent and concurrent to the BSM/CAM and SDSM message processing, the system's perception modules process sensor data to predict object-actor detections and classifications. In some embodiments, the system's sensor suite may be calibrated on a fixed deployment road area. The calibration data is input as a base reference layer in the System Relative Coordinate Reference Map 500. Known points and coordinates relative to the sensor persist in a fixed field of reference of each sensor's field of view. All static or otherwise persistent object-actors in the sensor suite's field of view may be assigned pixel and/or voxel spatial system classifications with relative and objective (e.g., GNSS global) map locations.

In some non-limiting embodiments, the system's perception models 200, 201, 202, 203, 205 may be provided with a pixel (or respective modality unit) pre-mapped configuration that aligns received sensor data pixels with a System Relative Coordinate Reference Map mensurated pixel field (or equivalent sensor data unit set). The pre-mapped pixel field assigns known static occupied pixel-voxel space. A change between the known pixel pre-mapped pixel field indicates a change to the environment and/or object-actor occupying the space in front of the a priori mensurated pixel. The perception models with preprocessed pixel data field sets corresponding to the System Relative Coordinate Reference map may use the pixel occupancy change inputs to infer the presence of an object-actor. In combination with adjacent pixel deltas the model set is provided an augmented data set beyond the raw sensor capture data for which to use to predict object-actor detection and classification (with corresponding position inference to place on the System Relative Coordinate Reference map 500.

Independent of the sensor specific perception modules the sensor fusion processor module merges sensor data into a multi-spectrum dataset frame stream 304 for use by the Fused Stream Perception Model 205 to perform detection and classification. Detection, performed by a perception model 200, 201, 202, 203, 205, is the process and corresponding output of determining the presence of a discrete object-actor in a sensor's field of view. Classification, performed by a perception model 200, 201, 202, 203, 205, is the process and corresponding output of determining the type, class, and/or instance of a detected object-actor (e.g., sedan, tractor trailer, SUV, pedestrian, etc.). The output of the sensor specific perception models 300, 301, 302, 303 and the fused stream perception model set 205 are fed into the Aggregate Confidence Voting Module 501 to reconcile and prune the predicted detection and classification outputs. The Aggregate Confidence Voting Module processes internal predicted perception based on the precision of the multiple sensor modality perception models and the fused perception model set agreeing or disagreeing. In some non limiting embodiments this process may occur prior to the system determining the overall system confidence level on its own perception.

The System Relative Coordinate Reference Map 500 maintains object-actor artifacts associated from external participants as well as the system's internal perception model predicted object-actor associated artifacts. The system relative coordinate reference map 500 comprises a data structure wherein persistent and/or temporary data artifacts representing object-actors and other data items representing road environment features are related to the host base system in a format of normalized reference units of measure related to the sensing system's current position and/or a frame of reference. The map 500 hosts runtime generated artifacts representing either the predicted object-actor or BSM/CAM reported object-actors respectively from the system predicted perception processes in the perception associated modules 204, 205 and aggregate confidence voting module 501 and the BSM/CAM ETL module 410. The generated artifacts contain position and occupancy attributes normalized with respect to the base system reference coordinate system contained in the map. In some non-limiting embodiments, the map also may host a priori determined and/or run-time mapped and sensed road environmental features.

The Perception Reconciliation Module 502 through algorithms and/or model sets conducts a match and reconciliation process on object-actor artifacts. The module computes crossmatches between the available articles from the three different data based article sources: BSM/CAM based artifacts, SDSM based artifacts, and predicted perception object-actor based artifacts. The module references, makes measurements, and compares artifacts with criteria including object-actor geometry, category-type classification, pose, and tracked pose over the course of multiple sequential sample periods. Accordingly pose is defined as an object-actor's position, velocity (speed and direction of motion), and spatial occupancy with respect to the system relative coordinate system constituting the base of the reference map 500. The Perception Reconciliation Module 502 process measures the variances between multiple object-actor artifacts representing the same object-actor; the module uses the measurements to crossmatch represented object-actors. The sequence of the module's measurements joined with count of contributing artifacts provide additional criteria to determine confidence on the reconciled artifact.

In some non-limiting embodiments, where a BSM/CAM artifact is available a reconciled match establishes which sensor detected object-actor artifacts and SDSM are the same object-actor in BSM/CAM associated object-actors artifacts; a BSM/CAM based matched artifact group is established and ground truth with a corresponding artifact replacing the multiple artifacts representing the object-actor. Where no BSM/CAM is available the Perception Reconciliation Module 502 with the system's own perception predictions uses one or more J3224 message inputs to identify participant report based object-actor artifacts indicating consensus on the position, geometric dimensions, and classification of an object-actor.

The Perception Reconciliation Module 502 conducts object velocity tracking by processing two or more consecutive established object-actor detection and classification based artifacts populated on the System Relative Coordinate Reference map and determines the change between map occupancy to determine the velocity. In turn, the Perception Reconciliation Module 502 conducts acceleration tracking by processing the changes between two or more consecutive velocity tracking data items.

The Perception Reconciliation Module 502 through the match and prune process overcomes detection uncertainty introduced by different participants or the system's own perception modules that may produce variants in determination of object-actor detection. The Perception Reconciliation Module 502 through the match and prune process overcomes classification uncertainty introduced by different participants or the system's own perception modules that may produce variants in determination of object-actor detection. Provided determined high confidence detection and classification the Perception Reconciliation Module 502 tracks the sequential updates to determine velocity and acceleration tracks on the object.

The Perception Reconciliation Module 502 conducts run-time confidence level determination by measuring the differences between the predicted detection, classification and tracked object-actor artifacts, SDSMs based artifacts, and BSMs/CAMs based artifacts. The module 502 uses, when available, a BSM/CAM message as a base artifact to establish a base ground truth reference for which to crossmatch prediction and SDSM based artifacts. determination. The module 502 sorts the data in captured timestamp order; then measures the error between predicted artifact values and BSM/CAM based actual values for detection, classification, and tracking parameters including but not limited to the object-actor's category-type, position, dimensions, velocity, and acceleration. The measured error differences are summed by parameter respective units of measure; the module processes the parameter value differences through weighted decay functions to compute an overall view of system perception output accuracy. Using the determined accuracy values, the system provides indicator confidence levels based on the total number of ground truth verified predictions made in a runtime sample period and the differences between ground truth and system prediction. These confidence levels may be presented in an aggregated weighting or as individual confidence indicated components, e.g., a specific measured and weighted confidence for position, velocity, acceleration etc.

Furthermore, the Perception Reconciliation Module 502 by use of the accrued confidence checks may process indicated confidence levels on additional parameters comprising a road environment operational design domain including but not limited to areas of use times of day, weather conditions, speed of traffic travel, road network feature types, traffic signal states, and combinations thereof. The module maintains timers on each indicated confidence level parameter from the last received ground truth check; the module updates a system confidence in its own indicated confidence levels determination process through a time or event decay function that adjusts system confidence level when BSM/CAM received messages are not received in recent sample periods for the system to run confidence checks. Through this process the system will maintain high confidence in either the system perception inferences or in the condition that the system is highly confident that it is not indeed producing high confidence perception inference.

Through combination of matched and reconciled object-actor detection, classification and tracking perception process using available BSMs/CAMs for both runtime processing and offline model/algorithm training and refinement; and the runtime confidence level determination process the reconciliation module outputs statistically significant confidence level indicators for subsequent run-time use in the system's own perception data processing as well as sending the confidence level indicators to other systems external to the system.

The Perception Reconciliation Module formats the object-actor classification, position, velocity, and acceleration data into High Confidence Perception Data Messages 504 and sends to subscribing internal System processes 600, including the System Relative Coordinate Reference map 500 and to the System Network Interface 601 whereby the messages can be sent to external recipients such as participant ADAS equipped and Automated Driving System vehicles.

The system Sensor and Perception Logger 503 records runtime operation data for analytics and use in subsequent model refinement and continuous improvement.

A Priori Model Set—Algorithm Training and Calibration:

The system's Perception Models 200, 201, 202, 203, 205 and Perception Reconciliation Module 502 are trained and tuned on ground truth model training data obtained from J2735 BSM/CAM messages 406 of participant vehicles and object-actors operating in the vicinity of the emplaced system during calibration. The RTK corrected position reporting 409 is annotated in the logged data on the participant vehicles and other object-actors through the reconciliation process. The system uses these BSM/CAM messages as ground truth object-actors with a known position (e.g., object type: Vehicle-SUV; geometry box dimensions: width 2.2 meters, height 2.3 meters, length 4.2 meters; Position: latitude 32.553385°, longitude −96.822104°, elevation 197.815 meters). The BSM/CAM message report is transformed into format to place the known object-actor on the system referential coordinate system map. The known object-actor is crossmatched to the system perception module outputs concurrently populated on the system referential coordinate system map. A feedback loop of the crossmatches enables reviewers to assess the performance of the system's perception system and aid further refinements in the perception task.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A system comprising:
   one or more processors programmed or configured to:
   receive data associated with road environment object-actor sensor based detection and classification predictions, IEEE 1609 standard Security Credential Management System (SCMS) cryptographically signed SAE J2735 standard Basic Safety Messages (BSM)/Cooperative Awareness Messages (CAM), and IEEE 1609 standard SCMS cryptographically signed SAE J3224 standard Sensor Data Sharing Messages (SDSM); and
   determine run-time detection, classification, and tracking of object-actors in the road operating environment in relation to a system relative coordinate reference map,
   wherein for the determining detection, classification, and tracking of object-actors, the one or more processors are programmed or configured to:
   extract object-actor associated data in the received SCMS cryptographically signed SAE J2735 participant broadcasted Basic Safety Messages/Cooperative Awareness Messages from which an object-actor's pose is determined, wherein the received data includes, but is not limited to a reported object-actor's real-time kinematic GNSS corrected position, spatial dimensions, including a length, a width and/or a height, and the categorical-type classification of the object-actor, wherein the BSM/CAM extracted data is transformed into a format to store and retrieve the represented object-actor as an artifact within a system relative coordinate reference map;

extract object-actor associated data in received SCMS cryptographically signed SAE J3224 participant broadcast Sensor Data Sharing Messages (SDSM), wherein the received data may include an external observers' report of a sensed object-actor's position, category-type classification, timestamp of observation, and location in GNSS based global coordinates, and wherein the SDSM extracted data is transformed into a format to store and retrieve the represented object-actor as an artifact within a system relative coordinate reference map;

predict object-actors presence and pose present within the fields of view of the one or more sensors of the system; wherein the predicted object-actor output is sent to the system relative coordinate reference map as a predicted object-actor artifact;

determine the existence of an actual object-actor in the road environment associated with representative object-actor artifacts in the system relative coordinate reference map, wherein one or more procedures and/or machine learning models determine that two or more artifacts correspond to the same object-actor, wherein a minimum of one of the two or more artifacts is associated with a received BSM/CAM data upon which one or more algorithms and or machine learning models establishes the existence of a relationship between two or more object-actor representative artifacts, wherein a matched pair or set of artifacts containing a BSM/CAM based artifact is reduced to a ground truth object-actor in the system reference map, and the match reference is applied to crossmatched artifacts to construct a ground truth object-actor artifact to reside in the applicable state within the system relative coordinate reference map, when no sensor associated object-actor artifacts are identified as a match to a BSM/CAM artifact the BSM/CAM is established as a ground truth perception object-actor, wherein in the absence of a BSM/CAM associated artifact but there exists representative object-artifacts based on predicted perception data and/or SDSM messages, measure the artifacts' parameters in relation to each other with respect to the system relative coordinate system map wherein the module with one or more algorithms and or machine learning models establishes the existence of a match between two or more object-actor representative artifacts and determines confidence level of a crossmatch between two or more object-actor artifacts, where the parameters used to determine crossmatch include but are not limited to object-actor classification category-type, position, velocity, and acceleration;

determine confidence levels on object-actor predicted detection, classification, and tracking, wherein measurement of the accuracy of aggregate weighted prediction of object-actor detection classification and tracking over the course of preceding and the current run-time outputs with available BSM/CAM based object-actor data artifacts determines the error between predicted vs actual detection, classification, and tracking, wherein the measured accuracies are persisted in system memory for reference in subsequent run-time operation, wherein the measured accuracy established from received BSM/CAM data based artifacts is determined as an objective comparison to measure internal generated predicted perception, external generated SDSMs, and the aggregate combinations thereof against actual detection and classification, and tracking parameter values, wherein the system determines a confidence interval based on a priori and runtime updated thresholds of accuracy, wherein associated thresholds are comprised of parameter value ranges determined to meet statistically significant precision requirements that indicate low uncertainty about a predicted value and merit the use of the underlying predicted value for perception runtime use in a road environment, wherein the outputs are confidence intervals for the crossmatched object-actor's current reconciled state parameter values including indication of high confidence for the predicted object-actor associated state values or high-confidence that the system's perception is unable to detect, classify, and track object-actors within threshold range, wherein with the ground truth or otherwise matched perception process predicted or SDSM reported object-actor precursor artifacts used to determine match are removed from the reference map, wherein the output of the matched artifacts with corresponding map update is an aggregate reconciled collection of run-time determined ground truth and high confidence detection, classification, and tracking of object-actors in the road environment, wherein the system relative coordinate reference map updates to reflect the determined state for subsequent system runtime use and/or external transmission of ground truth data; and persist the matched object-actors artifacts as ground truth or high confidence determined object-actors in the system relative reference coordinate map which subsequently are logged with crossmatched and reconciled data including confidence level attributes associated with Basic Safety Messages/Cooperative Awareness Messages, Sensor Data Sharing Messages and road environment sensor-perception data.

2. The system of claim 1, wherein the one or more processors are further programmed or configured to:

determine the current run-time confidence interval based on the current run-time present measurable environmental conditions and the frequency, accuracy, and timeliness of BSM/CAM based accuracy measurements occurring prior to this determination, wherein determination of is related to the measured performance of the reconciliation of predicted object-actors output and the BSM/CAM associated ground truth output, wherein the output are differences between actual and predicted object-actor state attributes comprise data, wherein the output is compared to time and condition weight data to determine confidence intervals for respective state attributes.

3. The system of claim 1, wherein the one or more processors are further programmed or configured to:

determine the current adjustment factor to associate with the run-time and current environmental conditions and system measured accuracy performance, wherein the adjustment factors are timestamped, and the timestamped factors are used to determine a decay factor that adjusts the confidence interval associated tolerances based on statistical significance of the historical uncertainty introduced beyond the moment of immediate ground truth vs predicted reconciliation, the output being used to generate internal data to base the determination of the systems confidence in its determination of perception.

4. The system of claim 1, wherein the one or more processors are further programmed or configured to:
construct high confidence perception reports for use by both internal and external systems, wherein the output for external systems is transmitted via one or more network devices or radio frequency transceivers.

5. The system of claim 1, wherein the one or more processors are further programmed or configured to:
persist sensor data and reconciled ground truth and high confidence perception outputs with timestamps, wherein the timestamps relate reconciled perception outputs as labeled features in the corresponding logged sensor data, wherein the labeled, logged data collection provides machine learning model training material for a priori machine learning model training and subsequent construction of high confidence perception models.

6. The system of claim 1, wherein for the determining detection, classification, and tracking of object-actors, the one or more processors are programmed or configured to:
construct representative object-actor artifacts within a system relative coordinate reference map, wherein a coordinate system comprises a data structure wherein persistent and/or temporary data representing road environment features and object-actors are related to the host base system in a format of normalized reference units of measure related to the sensing system's current position and/or a frame of reference, wherein the object-actors represented in the reference map are data artifacts generated from either sensor based predicted perception associated output data, SDSM based message data, or from BSM/CAM based message data which contain position and occupancy attributes normalized with respect to the base system reference coordinate system, wherein in addition to the object-actor artifacts applicable a priori and/or run-time mapped and sensed road environmental features are also represented.

7. The system of claim 1, wherein the output of prediction comprises predicted detection and classification of object-actors' presence, position, spatial dimensions, and category-type associated with received sensor data, wherein the received sensor data is associated with one or more camera, LIDAR, thermal, or RADAR sensor, and wherein the prediction is based on the output of one or more machine learning models that predict the presence, position, category-type, and geometric dimensions of an object-actor.

8. A method comprising:
receiving data associated with road environment object-actor sensor based detection and classification predictions, IEEE 1609 standard Security Credential Management System (SCMS) cryptographically signed SAE J2735 standard Basic Safety Messages (BSM)/Cooperative Awareness Messages (CAM), and IEEE 1609 standard SCMS cryptographically signed SAE J3224 standard Sensor Data Sharing Messages (SDSM);
determining run-time detection, classification, and tracking of object-actors in the road operating environment in relation to a system relative coordinate reference map,
wherein the determining detection, classification, and tracking of object-actors further comprises:
extracting object-actor associated data in the received SCMS cryptographically signed SAE J2735 participant broadcasted Basic Safety Messages/Cooperative Awareness Messages from which an object-actor's pose is determined, wherein the received data includes, but is not limited to a reported object-actor's real-time kinematic GNSS corrected position, spatial dimensions, including a length, a width and/or a height, and the categorical-type classification of the object-actor, wherein the BSM/CAM extracted data is transformed into a format to store and retrieve the represented object-actor as an artifact within a system relative coordinate reference map;
extracting object-actor associated data in received SCMS cryptographically signed SAE J3224 participant broadcast Sensor Data Sharing Messages (SDSM), wherein the received data may include an external observers' report of a sensed object-actor's position, category-type classification, timestamp of observation, and location in GNSS based global coordinates, and wherein the SDSM extracted data is transformed into a format to store and retrieve the represented object-actor as an artifact within a system relative coordinate reference map;
predicting object-actors presence and pose present within the fields of view of the one or more sensors of the system; wherein the predicted object-actor output is sent to the system relative coordinate reference map as a predicted object-actor artifact;
determining the existence of an actual object-actor in the road environment associated with representative object-actor artifacts in the system relative coordinate reference map, wherein one or more procedures and/or machine learning models determine that two or more artifacts correspond to the same object-actor, wherein a minimum of one of the two or more artifacts is associated with a received BSM/CAM data upon which one or more algorithms and or machine learning models establishes the existence of a relationship between two or more object-actor representative artifacts, wherein a matched pair or set of artifacts containing a BSM/CAM based artifact is reduced to a ground truth object-actor in the system reference map, and the match reference is applied to cross-matched artifacts to construct a ground truth object-actor artifact to reside in the applicable state within the system relative coordinate reference map, when no sensor associated object-actor artifacts are identified as a match to a BSM/CAM artifact the BSM/CAM is established as a ground truth perception object-actor,
wherein in the absence of a BSM/CAM associated artifact but there exists representative object-artifacts based on predicted perception data and/or SDSM messages, measure the artifacts' parameters in relation to each other with respect to the system relative coordinate system map wherein the module with one or more algorithms and or machine learning models establishes the existence of a match between two or more object-actor representative artifacts and determines confidence level of a crossmatch between two or more object-actor artifacts, where the parameters used to determine crossmatch include but are not limited to object-actor classification category-type, position, velocity, and acceleration;

determining confidence levels on object-actor predicted detection, classification, and tracking, wherein measurement of the accuracy of aggregate weighted prediction of object-actor detection classification and tracking over the course of preceding and the current run-time outputs with available BSM/CAM based object-actor data artifacts determines the error between predicted vs actual detection, classification, and tracking, wherein the measured accuracies are persisted in system memory for reference in subsequent run-time operation, wherein the measured accuracy established from received BSM/CAM data based artifacts is determined as an objective comparison to measure internal generated predicted perception, external generated SDSMs, and the aggregate combinations thereof against actual detection and classification, and tracking parameter values, wherein the system determines a confidence interval based on a priori and runtime updated thresholds of accuracy, wherein associated thresholds are comprised of parameter value ranges determined to meet statistically significant precision requirements that indicate low uncertainty about a predicted value and merit the use of the underlying predicted value for perception runtime use in a road environment, wherein the outputs are confidence intervals for the crossmatched object-actor's current reconciled state parameter values including indication of high confidence for the predicted object-actor associated state values or high-confidence that the system's perception is unable to detect, classify, and track object-actors within threshold range, wherein with the ground truth or otherwise matched perception process predicted or SDSM reported object-actor precursor artifacts used to determine match are removed from the reference map, wherein the output of the matched artifacts with corresponding map update is an aggregate reconciled collection of run-time determined ground truth and high confidence detection, classification, and tracking of object-actors in the road environment, wherein the system relative coordinate reference map updates to reflect the determined state for subsequent system runtime use and/or external transmission of ground truth data; and persisting the matched object-actors artifacts as ground truth or high confidence determined object-actors in the system relative reference coordinate map which subsequently are logged with crossmatched and reconciled data including confidence level attributes associated with Basic Safety Messages/Cooperative Awareness Messages, Sensor Data Sharing Messages and road environment sensor-perception data.

9. The method of claim 8, further comprising:
determining the current run-time confidence interval based on the current run-time present measurable environmental conditions and the frequency, accuracy, and timeliness of BSM/CAM based accuracy measurements occurring prior to this determination, wherein determination of is related to the measured performance of the reconciliation of predicted object-actors output and the BSM/CAM associated ground truth output, wherein the output are differences between actual and predicted object-actor state attributes comprise data, wherein the output is compared to time and condition weight data to determine confidence intervals for respective state attributes.

10. The method of claim 8, further comprising:
determining the current adjustment factor to associate with the run-time and current environmental conditions and system measured accuracy performance, wherein the adjustment factors are timestamped, and the time-stamped factors are used to determine a decay factor that adjusts the confidence interval associated tolerances based on statistical significance of the historical uncertainty introduced beyond the moment of immediate ground truth vs predicted reconciliation, the output being used to generate internal data to base the determination of the systems confidence in its determination of perception.

11. The method of claim 8, further comprising:
constructing high confidence perception reports for use by both internal and external systems, wherein the output for external systems is transmitted via one or more network devices or radio frequency transceivers.

12. The method of claim 8, further comprising:
persisting sensor data and reconciled ground truth and high confidence perception outputs with timestamps, wherein the timestamps relate reconciled perception outputs as labeled features in the corresponding logged sensor data, wherein the labeled, logged data collection provides machine learning model training material for a priori machine learning model training and subsequent construction of high confidence perception models.

13. The method of claim 8, wherein the determining detection, classification, and tracking of object-actors further comprises:
constructing representative object-actor artifacts within a system relative coordinate reference map, wherein a coordinate system comprises a data structure wherein persistent and/or temporary data representing road environment features and object-actors are related to the host base system in a format of normalized reference units of measure related to the sensing system's current position and/or a frame of reference, wherein the object-actors represented in the reference map are data artifacts generated from either sensor based predicted perception associated output data, SDSM based message data, or from BSM/CAM based message data which contain position and occupancy attributes normalized with respect to the base system reference coordinate system, wherein in addition to the object-actor artifacts applicable a priori and/or run-time mapped and sensed road environmental features are also represented.

14. The method of claim 8, wherein the output of prediction comprises predicted detection and classification of object-actors' presence, position, spatial dimensions, and category-type associated with received sensor data, wherein the received sensor data is associated with one or more camera, LIDAR, thermal, or RADAR sensor, and wherein the prediction is based on the output of one or more machine learning models that predict the presence, position, category-type, and geometric dimensions of an object-actor.

15. At least one non-transitory computer readable medium storing at least one computer program product that comprises one or more instructions that cause at least one processor to perform operations, comprising:
receiving data associated with road environment object-actor sensor based detection and classification predictions, IEEE 1609 standard Security Credential Management System (SCMS) cryptographically signed SAE J2735 standard Basic Safety Messages (BSM)/

Cooperative Awareness Messages (CAM), and IEEE 1609 standard SCMS cryptographically signed SAE J3224 standard Sensor Data Sharing Messages (SDSM); and determining run-time detection, classification, and tracking of object-actors in the road operating environment in relation to a system relative coordinate reference map, wherein the determining detection, classification, and tracking of object-actors further comprises:

extracting object-actor associated data in the received SCMS cryptographically signed SAE J2735 participant broadcasted Basic Safety Messages/Cooperative Awareness Messages from which an object-actor's pose is determined, wherein the received data includes, but is not limited to a reported object-actor's real-time kinematic GNSS corrected position, spatial dimensions, including a length, a width and/or a height, and the categorical-type classification of the object-actor, wherein the BSM/CAM extracted data is transformed into a format to store and retrieve the represented object-actor as an artifact within a system relative coordinate reference map;

extracting object-actor associated data in received SCMS cryptographically signed SAE J3224 participant broadcast Sensor Data Sharing Messages (SDSM), wherein the received data may include an external observers' report of a sensed object-actor's position, category-type classification, timestamp of observation, and location in GNSS based global coordinates, and wherein the SDSM extracted data is transformed into a format to store and retrieve the represented object-actor as an artifact within a system relative coordinate reference map;

predicting object-actors presence and pose present within the fields of view of the one or more sensors of the system; wherein the predicted object-actor output is sent to the system relative coordinate reference map as a predicted object-actor artifact;

determining the existence of an actual object-actor in the road environment associated with representative object-actor artifacts in the system relative coordinate reference map, wherein one or more procedures and/or machine learning models determine that two or more artifacts correspond to the same object-actor, wherein a minimum of one of the two or more artifacts is associated with a received BSM/CAM data upon which one or more algorithms and or machine learning models establishes the existence of a relationship between two or more object-actor representative artifacts, wherein a matched pair or set of artifacts containing a BSM/CAM based artifact is reduced to a ground truth object-actor in the system reference map, and the match reference is applied to crossmatched artifacts to construct a ground truth object-actor artifact to reside in the applicable state within the system relative coordinate reference map, when no sensor associated object-actor artifacts are identified as a match to a BSM/CAM artifact the BSM/CAM is established as a ground truth perception object-actor, wherein in the absence of a BSM/CAM associated artifact but there exists representative object-artifacts based on predicted perception data and/or SDSM messages, measure the artifacts' parameters in relation to each other with respect to the system relative coordinate system map wherein the module with one or more algorithms and or machine learning models establishes the existence of a match between two or more object-actor representative artifacts and determines confidence level of a crossmatch between two or more object-actor artifacts, where the parameters used to determine crossmatch include but are not limited to object-actor classification category-type, position, velocity, and acceleration;

determining confidence levels on object-actor predicted detection, classification, and tracking, wherein measurement of the accuracy of aggregate weighted prediction of object-actor detection classification and tracking over the course of preceding and the current run-time outputs with available BSM/CAM based object-actor data artifacts determines the error between predicted vs actual detection, classification, and tracking, wherein the measured accuracies are persisted in system memory for reference in subsequent run-time operation, wherein the measured accuracy established from received BSM/CAM data based artifacts is determined as an objective comparison to measure internal generated predicted perception, external generated SDSMs, and the aggregate combinations thereof against actual detection and classification, and tracking parameter values, wherein the system determines a confidence interval based on a priori and runtime updated thresholds of accuracy, wherein associated thresholds are comprised of parameter value ranges determined to meet statistically significant precision requirements that indicate low uncertainty about a predicted value and merit the use of the underlying predicted value for perception runtime use in a road environment, wherein the outputs are confidence intervals for the crossmatched object-actor's current reconciled state parameter values including indication of high confidence for the predicted object-actor associated state values or high-confidence that the system's perception is unable to detect, classify, and track object-actors within threshold range, wherein with the ground truth or otherwise matched perception process predicted or SDSM reported object-actor precursor artifacts used to determine match are removed from the reference map, wherein the output of the matched artifacts with corresponding map update is an aggregate reconciled collection of run-time determined ground truth and high confidence detection, classification, and tracking of object-actors in the road environment, wherein the system relative coordinate reference map updates to reflect the determined state for subsequent system runtime use and/or external transmission of ground truth data; and persisting the matched object-actors artifacts as ground truth or high confidence determined object-actors in the system relative reference coordinate map which subsequently are logged with crossmatched and reconciled data including confidence level attributes associated with Basic Safety Messages/Cooperative Awareness Messages, Sensor Data Sharing Messages and road environment sensor-perception data.

16. The at least one non-transitory computer readable medium of claim 15, wherein the operations further comprise:

determining the current run-time confidence interval based on the current run-time present measurable environmental conditions and the frequency, accuracy, and timeliness of BSM/CAM based accuracy measurements occurring prior to this determination, wherein determination of is related to the measured performance of the reconciliation of predicted object-actors output and the BSM/CAM associated ground truth output, wherein the output are differences between actual and predicted object-actor state attributes comprise data, wherein the output is compared to time and condition weight data to determine confidence intervals for respective state attributes.

17. The at least one non-transitory computer readable medium of claim 15, wherein the operations further comprise:

determining the current adjustment factor to associate with the run-time and current environmental conditions and system measured accuracy performance, wherein the adjustment factors are timestamped, and the timestamped factors are used to determine a decay factor that adjusts the confidence interval associated tolerances based on statistical significance of the historical uncertainty introduced beyond the moment of immediate ground truth vs predicted reconciliation, the output being used to generate internal data to base the determination of the systems confidence in its determination of perception.

18. The at least one non-transitory computer readable medium of claim 15, wherein the operations further comprise:

constructing high confidence perception reports for use by both internal and external systems, wherein the output for external systems is transmitted via one or more network devices or radio frequency transceivers.

19. The at least one non-transitory computer readable medium of claim 15, wherein the operations further comprise:

persisting sensor data and reconciled ground truth and high confidence perception outputs with timestamps, wherein the timestamps relate reconciled perception outputs as labeled features in the corresponding logged sensor data, wherein the labeled, logged data collection provides machine learning model training material for a priori machine learning model training and subsequent construction of high confidence perception models.

20. The at least one non-transitory computer readable medium of claim 15, wherein the determining detection, classification, and tracking of object-actors further comprises: constructing representative object-actor artifacts within a system relative coordinate reference map, wherein a coordinate system comprises a data structure wherein persistent and/or temporary data representing road environment features and object-actors are related to the host base system in a format of normalized reference units of measure related to the sensing system's current position and/or a frame of reference, wherein the object-actors represented in the reference map are data artifacts generated from either sensor based predicted perception associated output data, SDSM based message data, or from BSM/CAM based message data which contain position and occupancy attributes normalized with respect to the base system reference coordinate system, wherein in addition to the object-actor artifacts applicable a priori and/or run-time mapped and sensed road environmental features are also represented; and wherein the output of prediction comprises predicted detection and classification of object-actors' presence, position, spatial dimensions, and category-type associated with received sensor data, wherein the received sensor data is associated with one or more camera, LIDAR, thermal, or RADAR sensor, and wherein the prediction is based on the output of one or more machine learning models that predict the presence, position, category-type, and geometric dimensions of an object-actor.

* * * * *